US00RE38336E

(19) United States
(12) Reissued Patent
Williams

(10) Patent Number: US RE38,336 E
(45) Date of Reissued Patent: Dec. 2, 2003

(54) HYDROELECTRIC POWERPLANT

(76) Inventor: Herbert L. Williams, Rte. 1, Box 454, E. Palatka, FL (US) 32131

(21) Appl. No.: 09/231,063

(22) Filed: Jan. 14, 1999

Related U.S. Patent Documents

Reissue of:
(64) Patent No.: 5,592,816
Issued: Jan. 14, 1997
Appl. No.: 08/397,858
Filed: Feb. 3, 1995

(51) Int. Cl.[7] ..... F16D 31/02; B63H 1/34; B64C 11/24

(52) U.S. Cl. ..... 60/398; 415/7; 415/91

(58) Field of Search ..... 415/91, 7, 60, 415/8, 228; 60/398; 416/182, 185, 186 R, 192, 183 R

(56) References Cited

U.S. PATENT DOCUMENTS

| | | | | | |
|---|---|---|---|---|---|
| 3,001 | A | * | 3/1843 | Honner | 416/182 |
| 48,724 | A | * | 7/1865 | Rose | 416/237 |
| 54,123 | A | * | 4/1866 | Cushman | 416/182 |
| 98,552 | A | * | 1/1870 | Bryson et al. | 416/182 |
| 499,121 | A | | 6/1893 | Kales | 415/91 |
| 1,200,863 | A | * | 10/1916 | Morton | 415/192 |
| 4,004,427 | A | | 1/1977 | Butler, Jr. | 60/398 X |
| 4,031,702 | A | * | 6/1977 | Burnett et al. | 60/398 |
| 4,052,134 | A | | 10/1977 | Rumsey | 416/140 R X |
| 4,163,904 | A | * | 8/1979 | Skendrovic | 60/398 |
| 4,188,788 | A | * | 2/1980 | Eller | 60/398 |
| 4,219,303 | A | * | 8/1980 | Mouton et al. | 415/7 |
| 4,272,685 | A | * | 6/1981 | Toyama | 415/91 |
| 4,447,738 | A | * | 5/1984 | Allison | 60/398 X |
| 4,648,788 | A | * | 3/1987 | Jochum | 415/91 |
| 4,695,225 | A | * | 9/1987 | Hellat et al. | 415/189 |
| 4,729,716 | A | | 3/1988 | Schmidt | 416/142 X |
| 4,764,683 | A | | 8/1988 | Coombes | 415/60 X |
| 4,843,250 | A | | 6/1989 | Stupakis | 415/7 X |
| 5,440,176 | A | | 8/1995 | Haining | 415/7 X |
| 5,548,956 | A | * | 8/1996 | Price | 60/398 X |

FOREIGN PATENT DOCUMENTS

| | | | |
|---|---|---|---|
| AT | 101192 | 10/1925 | 415/7 |
| DE | 2902518 | 7/1979 | 415/7 |
| FR | 2258101 | 8/1975 | 415/7 |

* cited by examiner

*Primary Examiner*—Edward K. Look
*Assistant Examiner*—Thomas E. Lazo
(74) *Attorney, Agent, or Firm*—Saliwanchik, Lloyd & Saliwanchik

(57) ABSTRACT

A hydroelectric turbine and a method of using the turbine in an open body of water to produce electric power is described. A turbine has a large opening to allow a stream of water to pass through. The turbine is supported by a plurality of rubber tires such that a reaction force from the stream of water holds against the tires. A frame with a floatation chamber is used to lower the turbine into position in the stream of water, and to raise the turbine to a horizontal position on the surface of the body of water. The floatation chamber is partially filled with water to lower the turbine in the body of water such that an air pocket exists in the chamber to orient the turbine in a vertical position. When the chamber is purged of water, the turbine is raised to the surface. Rotation of the turbine drives the tires, which drive pumps to pump fluid to a motor, which drives an electric generator to produce power.

28 Claims, 4 Drawing Sheets

SECTION 8

SECTION 8

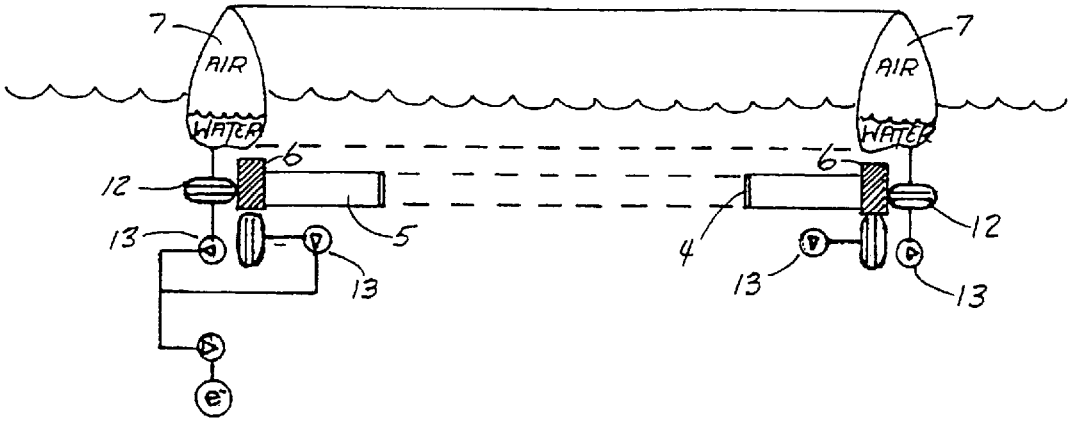
NON-ROTATIONAL MODE
FIG. 4
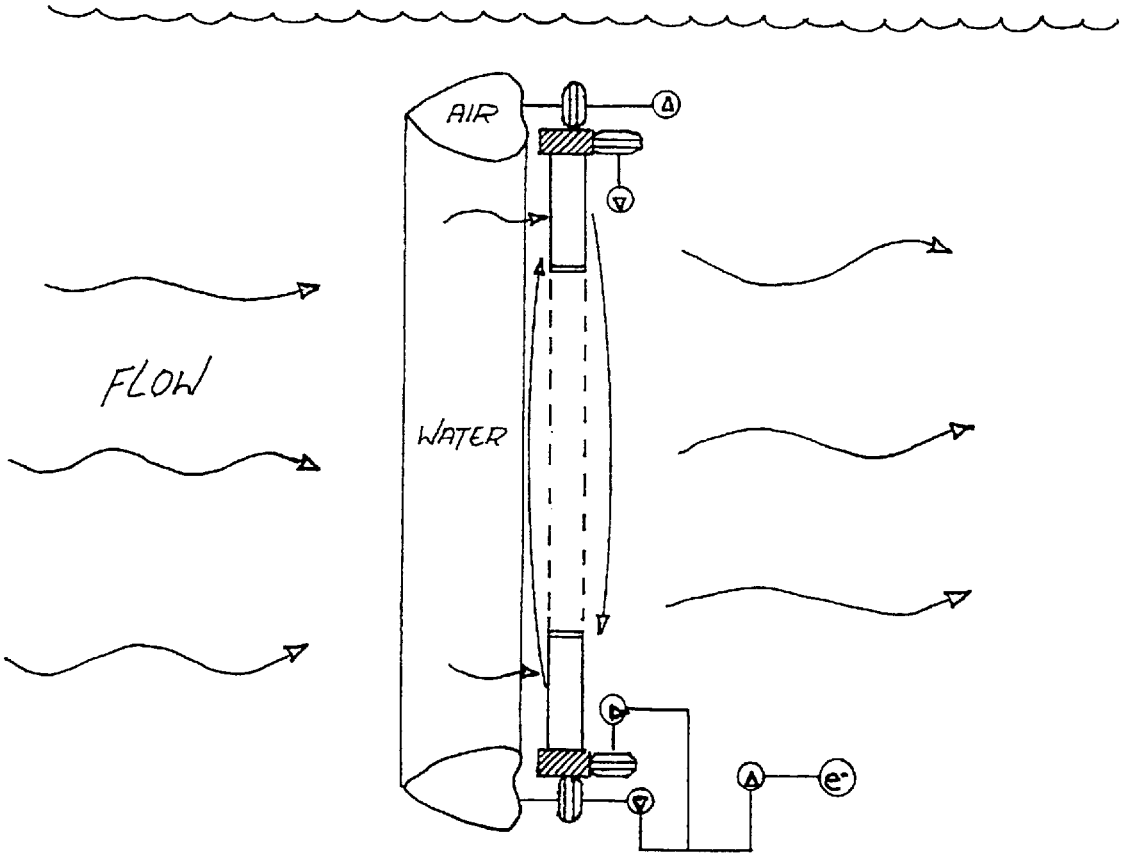
ROTATIONAL MODE

HYDROELECTRIC POWERPLANT

Matter enclosed in heavy brackets [ ] appears in the original patent but forms no part of this reissue specification; matter printed in italics indicates the additions made by reissue.

BRIEF SUMMARY

The present invention combines elements of a hydroelectric power plant, the entire system of which produces electricity in a totally submerged attitude below the oceans surface, and upon blowing ballast rises to the surface for transportation, inspection and maintenance. The system of the present invention produces electricity to be routed to shore through buried conductor cables to a land based switching station. The system of the present invention provides efficient electricity in the following manner:

The water current flows through two turbines causing them to turn each in opposite rotation of the other. Pressed tightly against the outer rims of the turbines are synthetic rubber tires coupled directly to hydraulic type pumps. The turbines turn the synthetic rubber tires which turn the hydraulic pumps which pump oil under pressure to the frame of the machine which is constructed of pipe. The oil under pressure is routed through passages in the frame to a central area where the hydraulically turned electric generator is located. The oil under pressure does the work of turning the generator and is returned back to the pumps through difference passages than those used for pressure.

The entire system is secured to the ocean bottom and buoyed off bottom so that no part of it is visible from the surface.

BRIEF DESCRIPTION OF THE DRAWINGS

FIG. 4, is a cross-section view of the power plant in both a rotational and a non-rotational mode.

DESCRIPTION OF THE PREFERRED EMBODIMENT

Figure 1:
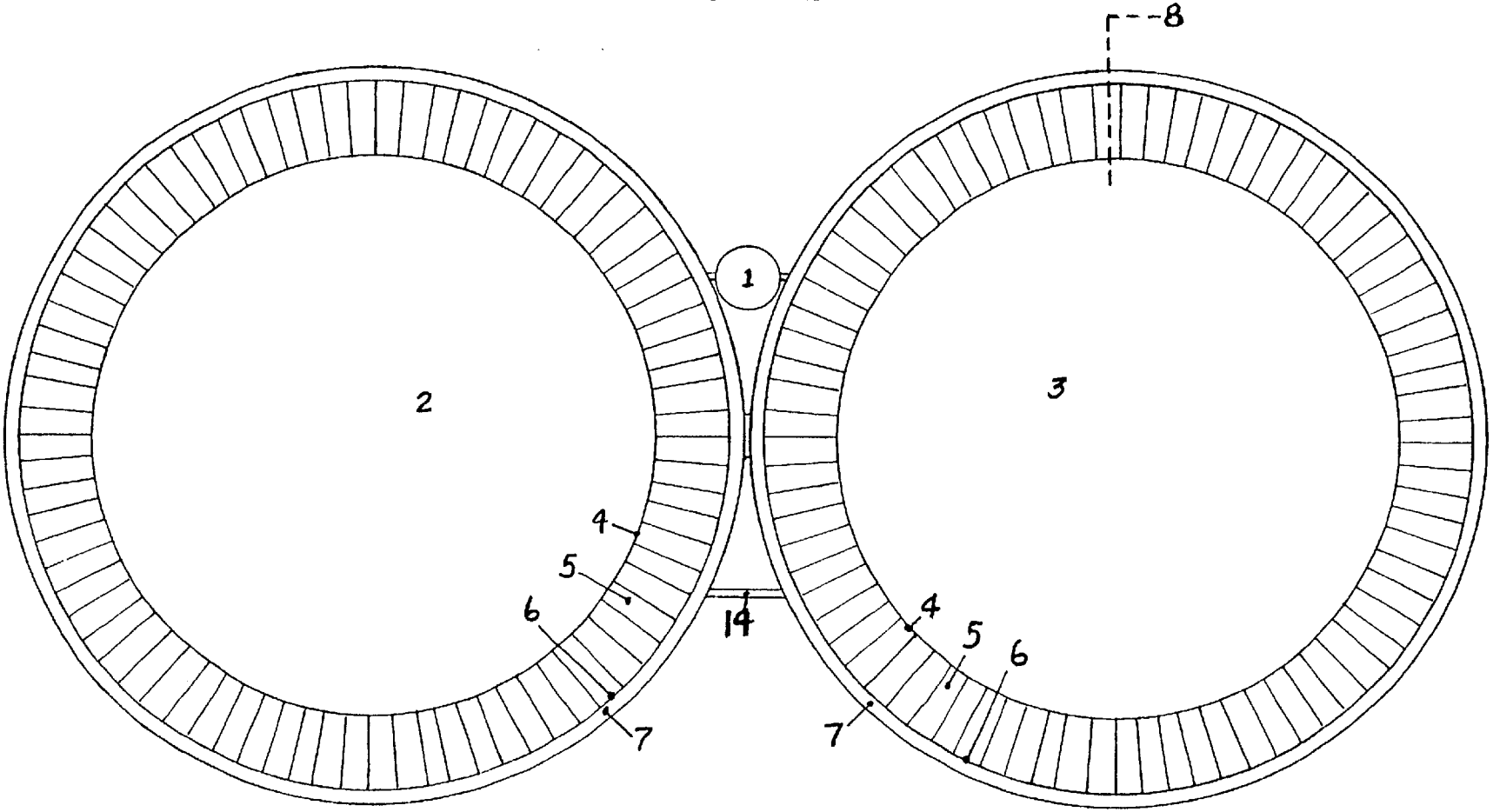
FIG. 1, is a elevation front view of a hydroelectric power plant according to an embodiment of the present invention, suspended from the bottom of the ocean is viewed from directly up current.
Figure 2:
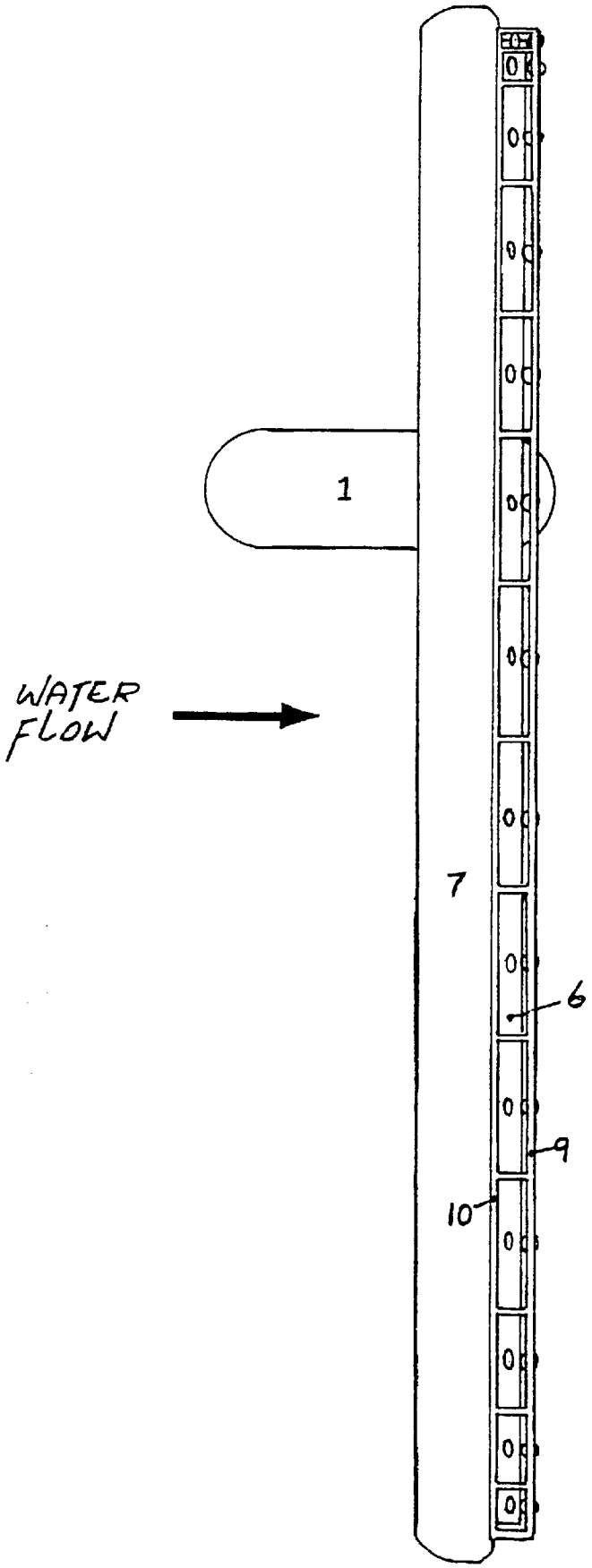
FIG. 2, is a representation in elevation side view of the hydroelectric power plant in FIG. 1.
Figure 3:
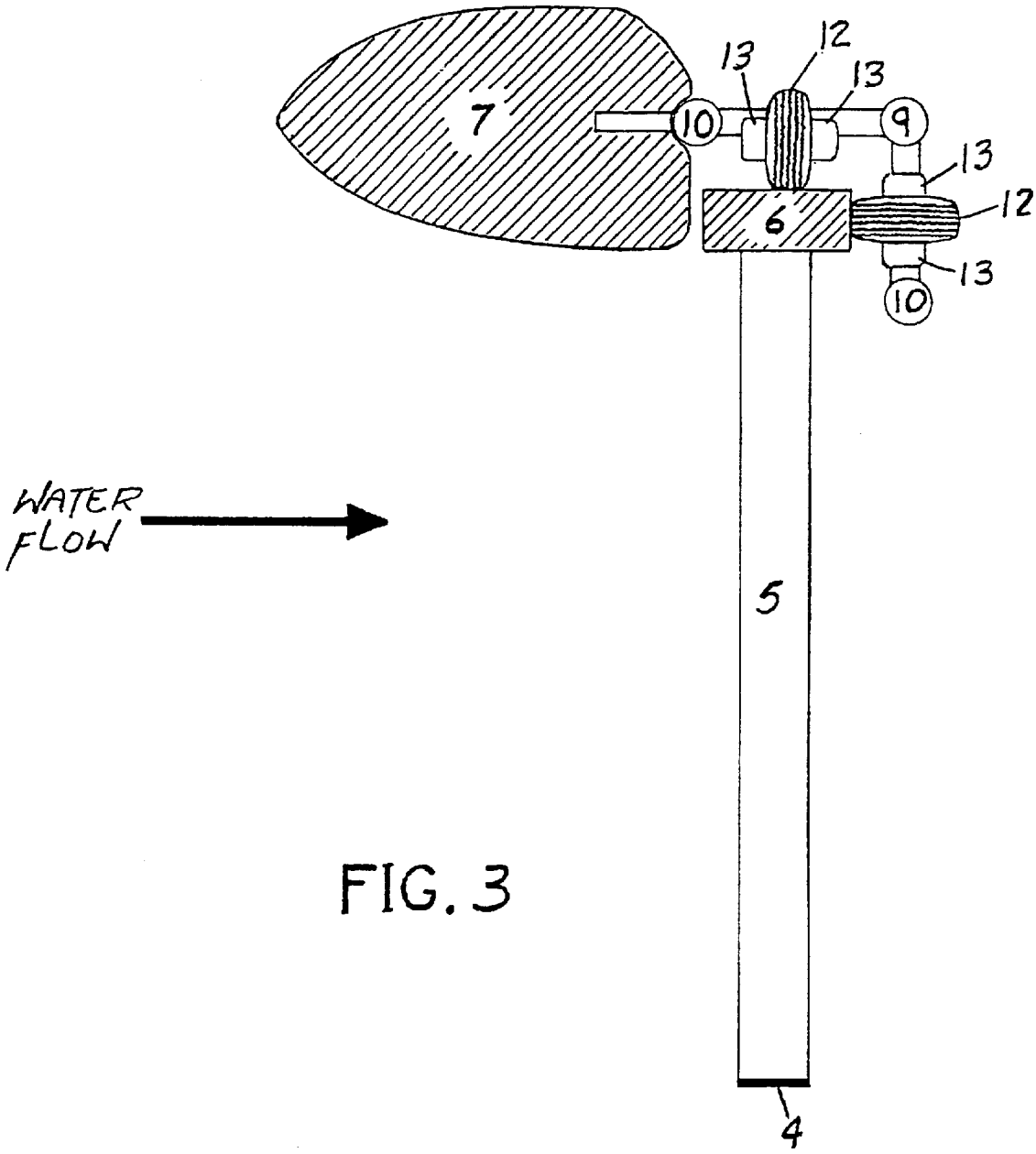
FIG. 3, is a cross-section developed view of the frame, turbine and flotation chamber of the hydroelectric power plant of FIGS. 1 and 2.

Referring now in detail to the drawings, and in particular to FIGS. 1, 2, 3 and 4, a hydroelectric power plant located submerged in a body of water with a current.

Two turbines 4, 5 and 6 which are identical to each other in every aspect except pitch are rotated in opposite rotation from each other by the pressure differential in the water current flowing through them. Blades 5 are of a shape which is pitched from leading edge to trailing edge which enables them to turn as a result of the pressure on the upstream side of the blades 5 being greater than that of the downstream sides. The inner rims 4 and the other rims 6 are secured to the blades 5 causing the entire turbines 4, 5 and 6 to be held securely together.

The synthetic rubber tires 12 are secured directly by the use of bolts to the shafts of the hydraulic pumps 13 which are attached to the frame 9 and 10 of the preferred embodiment. The pumps 13 when turned by the tires 12 pump oil under pressure which is introduced into the frame passage 9 to be routed to the generator enclosure 1 wherein is located a hydraulically powered generator. After the hydraulic oil has performed the work of turning the generator it is routed back to the pumps 13 via the frame passage 10. Brace 14 although structurally a brace to add rigidity to the frame 9 and 10 also is a passageway for hydraulic oil.

The floatation chambers 7 are hollow fiberglass enclosures which when filled with air cause the entire preferred embodiment to rise to the ocean surface and in doing so, fall forward taking on the attitude of being horizontal and floating on the surface. It is in this horizontal attitude that the turbines 4, 5 and 6 will stop turning since the pressure has equalized on both sides of blades 5. While in this horizontal attitude, the buoyancy of the flotation chambers 7 will hold the frame 9 and 10, the pumps 13, the tires 12 and the turbines 4, 5 and 6 above the waters surface to facilitate ease of transportation, inspection and maintenance.

When a portion of the air in flotation chambers 7 is released to the atmosphere, the water will enter the chambers 7 and allow the preferred embodiment to sink below the waters surface and back to its vertical attitude. As the water pressure against the blades 5 become unequal, the blades 5 will resume rotation and the generator will produce electricity.

The open areas 2 and 3 allow unrestricted water flow through them thereby reducing down current turbulence on the blades 5.

The frames 9 and 10, the flotation chambers 7, the pumps 13 and the generator enclosure 1 are held stationary in the water flow. Only the turbines 4, 5 and 6 and the tires 12 rotate in the water.

The tires 12 and the water flow hold the turbines 4, 5 and 6 on location while allowing them to rotate.

What is claimed is:

1. A hydroelectric turbine which:

has no central shaft;

transfers rotational energy from it's outer rim to synthetic rubber tires;

has an open area through it's center larger than the area occupied by it's blades;

has no bearings, bushings or friction load handling devices but depends on an external means to hold it in position.

2. A hydroelectric power plant for use in a body of water, comprising:

a turbine having a plurality of blades extending in a radial direction;

an outer and inner rim encircling the blades;

a plurality of rubber tires supporting the turbine in a vertical orientation during rotation of the turbine, and in a horizontal orientation during non-rotation of the turbine;

an electric generator enclosed in a generator enclosure, the generator being rotationally connected to at least one of the tires;

whereby a flow of water produces a rotation of the turbine, the rotation of the turbine produces a rotation of the tires, and the rotation of at least one of the tires produces a rotation of the generator which produces an electric power.

3. The hydroelectric power plant of claim 2 wherein the turbine has an open area through it's center which allows an unrestricted flow of water.

4. The hydroelectric power plant of claim 2 wherein the turbine is supported by rubber tires which are supported by a frame.

5. A method of stopping and starting a rotation of a turbine in a body of water, comprising the steps of:

providing a turbine having a plurality of blades extending in a radial direction;

providing an outer and inner rim encircling the blades;

providing a plurality of rubber tires to support the turbine in both a horizontal position and a vertical position;

providing a flotation chamber encircling the turbine;

filling the flotation chamber substantially with air to raise the turbine to a surface of the body of water such that a rotational axis of the turbine is perpendicular to the surface;

filling the flotation chamber substantially with water such that the heavier-than-air water comes to rest on a bottom of the flotation chamber and pulls the turbine under the surface of the water and pivots the turbine such that the rotational axis is directed parallel to the surface;

whereby a flow of water under the surface is directed along the rotational axis of the turbine to produce a rotation thereof.

6. A method of turning a generator in a body of water, comprising the steps of:

providing a hydraulic turbine of claim 5;

providing an electric generator enclosed in a generator enclosure;

providing at least one hydraulic motor being rotationally connected to an electric generator;

providing at least one hydraulic pump being rotationally connected to a plurality of rubber tires;

whereby the rotation of the turbine produces as rotation of the rotation of at least one rubber tire produces the rotation of at least one hydraulic pump which produces rotation of at least one hydraulic motor which produces rotation of an electric generator which produces an electric power.

7. A method of supporting a turbine in a body of water, comprising the steps of:

providing a turbine having a plurality of blades extending in a radial direction;

providing an outer and inner rim encircling the blades;

providing a plurality of rubber tires secured to a frame;

providing a frame with a flotation chamber secured to the bottom of the body of water and buoyed off bottom;

whereby a turbine which rotates is supported in every direction by rubber tires.

*8. A hydroelectric turbine which:*

*has an open area through its center, comprising:*

*a means for converting flow of a fluid into rotational energy of said turbine; and*

*a means for converting the rotational energy of said turbine into electricity, wherein said means for converting flow of a fluid into rotational energy of said turbine comprises:*

*a plurality of blades;*

*at least one rim to which each of said plurality of blades is connected;*

*wherein flow of a fluid passing over said plurality of blades causes said plurality of blades and said at least one rim to rotate;*

*an additional plurality of blades; and*

*at least one additional rim to which each of said additional plurality of blades is connected, wherein said at least one rim and said at least one additional rim are in a common plane, and wherein flow of the fluid passing over said additional plurality of blades causes said additional plurality of blades and said at least one additional rim to rotate in a direction opposite to the rotation of said at least one rim to which each of said plurality of blades is connected.*

*9. A hydroelectric turbine which:*

*has an open area through its center, comprising:*

*a means for converting flow of a fluid into rotational energy of said turbine; and*

*a means for converting the rotational energy of said turbine into electricity, wherein said means for converting flow of a fluid into rotational energy of said turbine comprises:*

*a plurality of blades; and*

*an inner rim to which an inner end of each of said plurality of blades is connected, and an outer rim to which an outer end of each of said plurality of blades is connected;*

*wherein flow of a fluid passing over said plurality of blades causes said plurality of blades and said inner rim and said outer rim to rotate,*

*and wherein said inner rim defines a boundary of said open area through the center of said hydroelectric turbine.*

*10. The hydroelectric turbine according to claim 9, wherein said inner rim defines an inner area greater than an outer area defined between said inner and outer rims.*

*11. The hydroelectric turbine according to claim 9, wherein the hydroelectric turbine has no central shaft.*

*12. A hydroelectric turbine which:*

*has an open area through its center, comprising:*

*a means for raising and lowering said turbine within a body of water, wherein said means for raising and lowering said turbine within a body of water also functions to rotate said turbine such that a plane containing said at least one rim rotates from a vertical to a horizontal position or rotates from a horizontal to a vertical position,*

*a means for converting flow of a fluid into rotational energy of said turbine; and*

*a means for converting the rotational energy of said turbine into electricity, wherein said means for converting flow of a fluid into rotational energy of said turbine comprises:*

*a plurality of blades; and*

*at least one rim to which each of said plurality of blades is connected;*

*wherein flow of a fluid passing over said plurality of blades causes said plurality of blades and said at least one rim to rotate.*

*13. The hydroelectric turbine according to claim 12, wherein said means for raising and lowering said turbine comprises:*

*at least two floatation chambers,*

*wherein said floatation chambers are filled with varying proportions of liquid and gas in order to raise and lower said turbine.*

*14. A hydroelectric turbine which:*

*has an open area through its center, comprising:*

*a means for converting flow of a fluid into rotational energy of said turbine; and*

*a means for converting the rotational energy of said turbine into electricity, wherein said means for converting flow of a fluid into rotational energy of said turbine comprises:*

*a plurality of blades; and*

*at least one rim to which each of said plurality of blades is connected;*

*wherein flow of a fluid passing over said plurality of blades causes said plurality of blades and said at least one rim to rotate, wherein said means for converting the rotational energy of said turbine into electricity comprises:*

*at least one hydraulically powered generator,*

*wherein said at least one hydraulically powered generator is powered by hydraulic fluid pressurized by at least one hydraulic pump, and wherein said at least one hydraulic pump is powered by the rotational energy of said turbine,*

*further comprising at least one means for converting the rotational energy of said turbine into rotation of a shaft of each of said at least one hydraulic pump, wherein rotation of said shaft pressurizes the hydraulic fluid which powers the generator,*

*wherein said at least one means for converting the rotational energy of said turbine into rotation of a shaft of each of said at least one hydraulic pump also functions to maintain said plurality of blades connected to said at least one rim in position with respect to a plane perpendicular with the lateral flow of the fluid while flow of the fluid passing over said plurality of blades causes said plurality of blades and said at least one rim to rotate.*

*15. The hydroelectric turbine according to claim 14, further comprising a frame, wherein said means for converting the rotational energy of said turbine into electricity is attached to said frame and said pressurized fluid is routed through passages in said frame.*

*16. The hydroelectric turbine according to claim 14, wherein said at least one means for converting the rotational energy of said turbine into rotation of a shaft of each of said at least one hydraulic pump also functions to maintain said plurality of blades connected to said at least one rim in position with respect to an axis of rotation of said plurality of blades connected to said at least one rim.*

*17. A hydroelectric turbine which:*

*has an open area through its center, comprising:*

*a means for converting flow of a fluid into rotational energy of said turbine; and*

*a means for converting the rotational energy of said turbine into electricity, wherein said means for converting flow of a fluid into rotational energy of said turbine comprises:*

*a plurality of blades; and*

*at least one rim to which each of said plurality of blades is connected;*

*wherein flow of a fluid passing over said plurality of blades causes said plurality of blades and said at least one rim to rotate, wherein said means for converting the rotational energy of said turbine into electricity comprises:*

*at least one hydraulically powered generator,*

*wherein said at least one hydraulically powered generator is powered by hydraulic fluid pressurized by at least one hydraulic pump, and wherein said at least one hydraulic pump is powered by the rotational energy of said turbine,*

*further comprising at least one means for converting the rotational energy of said turbine into rotation of a shaft of each of said at least one hydraulic pump, wherein rotation of said shaft pressurizes the hydraulic fluid which powers the generator,*

*wherein said at least one means for converting the rotational energy of said turbine into rotation of a shaft of each of said at least one hydraulic pump frictionally contacts said at least one rim such that said at least one rim rotates said means for converting the rotational energy of said turbine into rotation of a shaft of each of said at least one hydraulic pump as said at least one rim rotates.*

*18. The hydroelectric turbine according to claim 17, wherein each of said at least one means for converting the rotational energy of said turbine into rotation of a shaft of each of said at least one hydraulic pump comprises:*

*a rubber tire,*

*wherein the rubber tire frictionally contacts said at least one rim such that said at least one rim rotates said means for converting the rotational energy of said turbine into rotation of a shaft of each of said at least one hydraulic pump as said at least one rim rotates.*

*19. A method of converting flow of a fluid into electricity, comprising the steps of:*

*converting flow of a fluid into rotational energy of a turbine, wherein said turbine has an open area through its center;*

*powering at least one hydraulic pump by the rotational energy of said turbine, to produce pressurized hydraulic fluid;*

*powering at least one hydraulically powered generator by said pressurized hydraulic fluid to product electricity,*

*wherein said turbine comprises:*

*a plurality of blades; and*

*at least one rim to which each of said plurality of blades is connected;*

*wherein flow of said fluid passing over said plurality of blades causes said plurality of blades and said at least one rim to rotate, converting flow of the fluid into rotational energy of said turbine,*

*where said turbine comprises:*

*an inner rim, to which an inner end of each of said plurality of blades is connected; and an outer rim to which an outer end of each of said plurality of blades is connected, wherein said inner rim defines a boundary of an open area through the center of said hydroelectric turbine.*

*20. The method according to claim 19, wherein said turbine is secured to a bottom of a body of water such that flow of water within said body of water is converted to electricity.*

*21. The method according to claim 19, wherein said inner rim defines an inner area greater than an outer area defined between said inner and outer rims.*

*22. The method according to claim 21, where said means for raising and lowering said turbine within a body of water also functions to rotate said turbine such that a plane containing said at least one rim rotates from a vertical to a horizontal position or rotates from a horizontal to a vertical position.*

*23. The method according to claim 19, wherein said turbine further comprises a means for raising and lowering said turbine within a body of water.*

*24. The method according to claim 23, wherein said means for raising and lowering said turbine comprises:*

*at least two floatation chambers,*

*wherein said floatation chambers are filled with varying proportions of liquid and gas in order to raise and lower said turbine.*

*25. The method according to claim 19, wherein said turbine comprises a frame, wherein said at least one hydrau-*

*lic pump is attached to said frame and said pressurized fluid is routed through passages in said frame.*

*26. The method according to claim 19, wherein the step of powering at least one hydraulic pump by the rotational energy of said turbine comprises the step of converting the rotational energy of said turbine into rotation of a shaft of each of said at least one hydraulic pump, wherein rotation of said shaft pressurizes the hydraulic fluid which powers the hydraulically powered generator.*

*27. The method according to claim 19,*

*wherein said turbine has no central shaft.*

*28. A method of converting flow of a fluid into electricity, comprising the steps of:*

*converting flow of a fluid into rotational energy of a turbine, wherein said turbine has an open area through its center;*

*powering at least one hydraulic pump by the rotational energy of said turbine, to produce pressurized hydraulic fluid;*

*powering at least one hydraulically powered generator by said pressurized hydraulic fluid, to produce electricity;*

*wherein said turbine comprises:*

*a plurality of blades; and*

*at least one rim to which each of said plurality of blades is connected;*

*wherein flow of said fluid passing over said plurality of blades causes said plurality of blades and said at least one rim to rotate, converting flow of the fluid into rotational energy of said turbine,*

*wherein said turbine further comprises:*

*an additional plurality of blades; and*

*at least one additional rim to which each of said additional plurality of blades is connected, wherein said at least one rim and said at least one additional rim are in a common plane, and wherein flow of the fluid passing over said additional plurality of blades causes said additional plurality of blades and said at least one additional rim to rotate, converting flow of the fluid into rotational energy of said turbine, wherein said additional plurality of blades and said at least one additional rim rotate in a direction opposite to the rotation of said at least one rim to which each of said plurality of blades is connected.*

* * * * *